Aug. 15, 1933.  S. B. STINE  1,922,828

METHOD OF MAKING SCREENS

Filed May 23, 1932  2 Sheets-Sheet 1

INVENTOR
Samuel Blaine Stine,
By Archworth Martin,
Attorney.

Aug. 15, 1933.  S. B. STINE  1,922,828
METHOD OF MAKING SCREENS
Filed May 23, 1932  2 Sheets-Sheet 2

INVENTOR
Samuel Blaine Stine,
By Archworth Martin,
Attorney.

Patented Aug. 15, 1933

1,922,828

UNITED STATES PATENT OFFICE 1,922,828

METHOD OF MAKING SCREENS

Samuel Blaine Stine, Osceola Mills, Pa.

Application May 23, 1932. Serial No. 613,021

9 Claims. (Cl. 29—163.5)

My invention relates to the manufacture of metal screens such as screen plates, etc., and particularly to those requiring very fine orifices or slot openings.

One object of my invention is to provide an integral screen plate having much finer screening passages or slits than heretofore possible to secure by the usual methods of slitting.

Another object of my invention is to provide an improved method of forming screen slots by the use of an oxygen burner tip.

Still another object of my invention is to provide a method and apparatus for making screens having slots narrower than it is possible to secure by use of a burner tip or a slitting saw.

Figure 1:
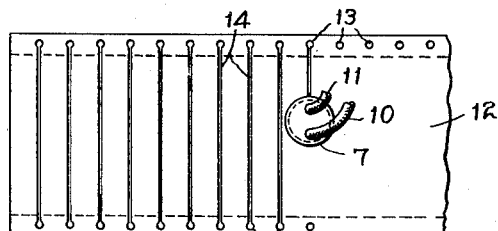
Figure 2:
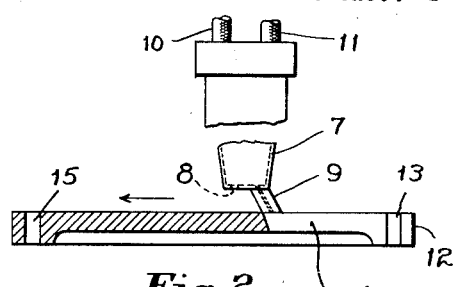
Figure 3:
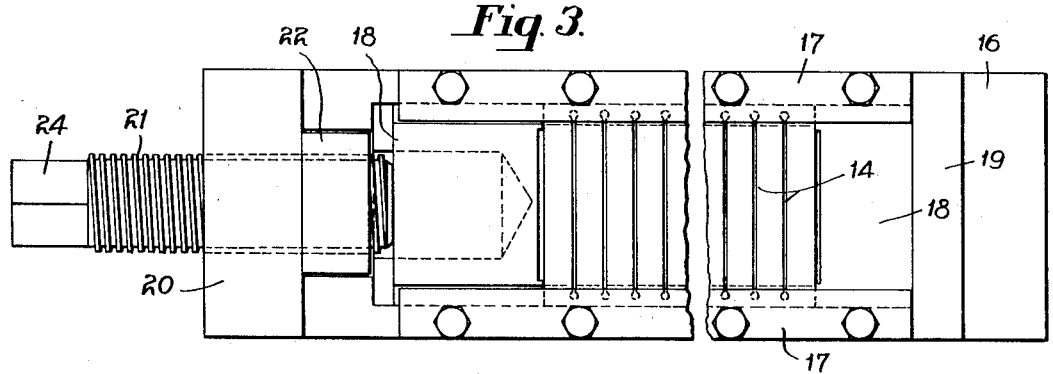
Figure 4:
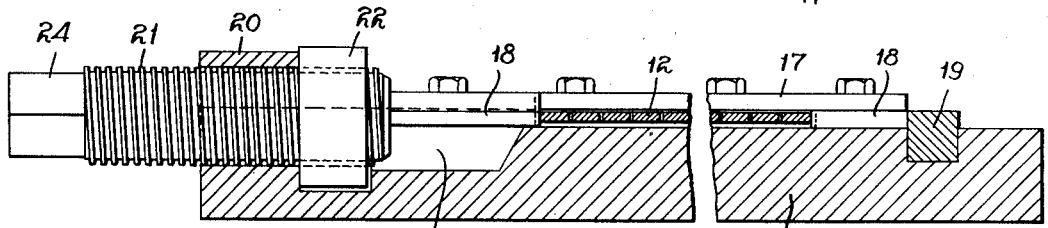
Figure 5:
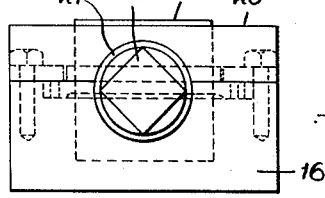
Figure 6:
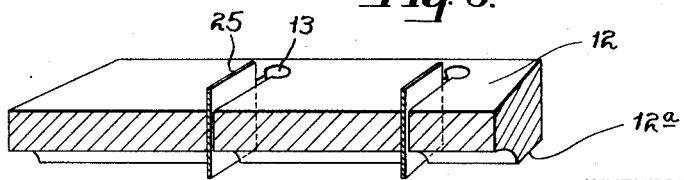
Figure 7:
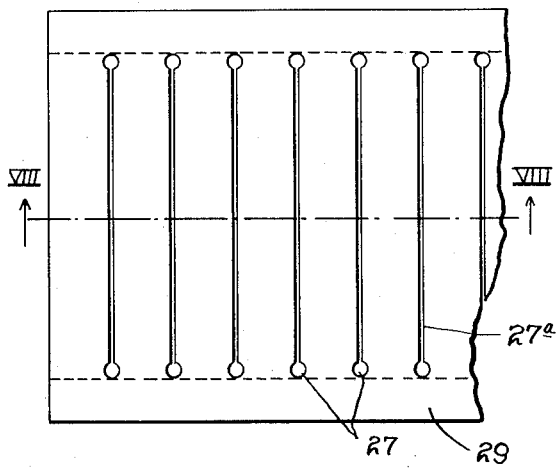
Figure 9:
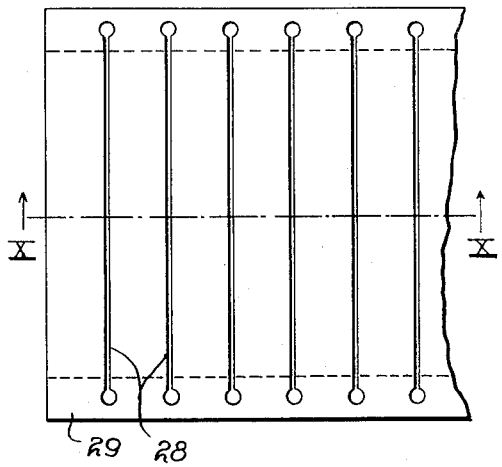
Figure 8:
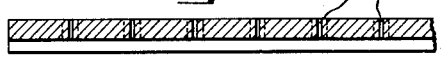
Figure 10:
Figure 11:
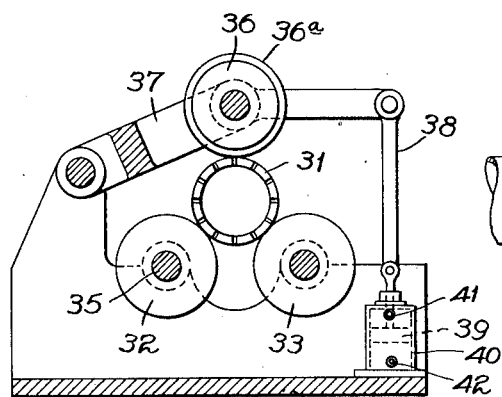
Figure 12:
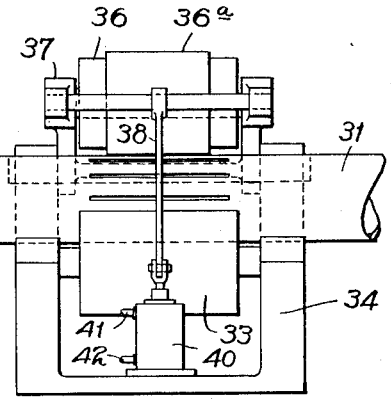
Figure 13:
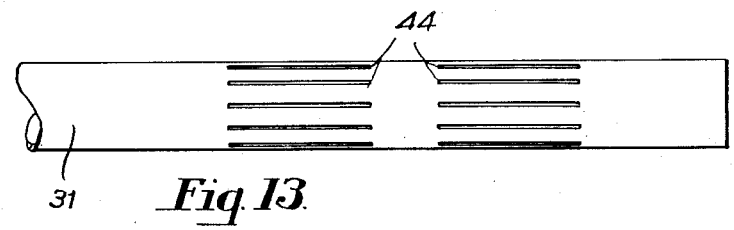

Means whereby my invention may be practised are shown in the accompanying drawings wherein Figure 1 is a plan view of a portion of a screen plate during the process of forming slits therein; Fig. 2 is a sectional view, on an enlarged scale, of the structure of Fig. 1; Fig. 3 is a fragmentary plan view showing means for contracting or narrowing the slits formed in the plate of Fig. 1; Fig. 4 is a longitudinal sectional view of the structure of Fig. 3; Fig. 5 is an end elevational view thereof; Fig. 6 shows the manner in which the walls of the screen slots are prevented from being brought too closely together when the plate is compressed by the apparatus of Fig. 3; Fig. 7 shows a plan view of a modified form of screen plate; Fig. 8 is a view, taken on the line VIII—VIII of Fig. 7; Fig. 9 is a view showing another form of plate; Fig. 10 is a view taken on the line X—X of Fig. 9; Fig. 11 shows a manner in which slots in a pipe may be narrowed; Fig. 12 is a front elevational view of the structure of Fig. 11, and Fig. 13 shows a portion of a completed pipe.

In the forming of screen plates by the use of a torch tip which has an outlet or outlets for the heating gas and an oxygen outlet or orifice, it has been common practice to have these outlets or orifices disposed in a common plane at the discharge end of the tip, and to hold the tip spaced some distance from the plate through which the slots are being burned. If these tips are held too close to the plate, the heating flame will be extinguished, and slag, such as that formed by loosening of scale on the plate, will be blown from the oxygen orifice against the orifice for the heating gas, thereby clogging the same.

Even if the tip is held away from the plate a considerable distance as in common practice, slag is developed in advance of the oxygen orifice, which deflects the oxygen stream and causes the cutting of a wider and often uneven slot.

In order to overcome these difficulties, I provide a cutting torch of such form that the heating flame will not be interfered with, even though the oxygen orifice is carried along in scraping engagement with the plate being operated on, and wherein the slag developed during the burning of the slot will not interfere with the proper flow of oxygen.

As shown in the accompanying drawings, a torch or burner tip 7 is provided with an orifice 8 for the heating gas, and with an orifice 9 for the oxygen. These orifices are supplied through conduits 10 and 11, respectively, from any suitable source of gas and oxygen supply. A plurality of orifices for the heating gas can, of course, be provided where desired.

The torch is shown as employed in the cutting of screening slots in a metal plate 12. Preliminary to applying the torch to the plate, I preferably drill or burn holes 13 along one edge of the plate. The torch is then applied to cut slots 14, such slits extending from these holes at one edge of the plate to a point adjacent to the other edge thereof. Holes 15 are then drilled or formed in the plate at the ends of the slits. The tip is placed on the plate at one of the holes 13 and moved across the plate in the direction indicated by the arrow in Fig. 2, the heating orifice 8 being, of course, in advance of the oxygen orifice 9. The heating orifice 8 is located at some distance above the orifice 9, a vertical spacing of about $\frac{1}{16}$ of an inch being found to be sufficient in most cases. The oxygen tip 9 is inclined downwardly and backwardly and is preferably maintained in engagement with the plate during movement of the torch across the plate. If the orifice 9 is maintained out of contact with the plate a distance greater than approximately 1/64 of an inch, I find that the slots will be wider than desired for some purposes.

The location of the heating orifice 8 in spaced relation to the plate prevents the heating flame from being smothered, while the inclination of the orifice 9 prevents slag from accumulating in advance of such orifice, and thus interfering with the proper flow of oxygen.

I have also found that if the oxygen orifice is set even at a very slight angle transversely of the slot line that whatever slag is formed will collect along one side or edge of the slot instead of in the slot.

By making the gas passage of the oxygen tip 9 approximately .005 of an inch or smaller in diameter, and maintaining it in contact with the plate, I am enabled to cut slots as small as .015 inches in width. These dimensions are, of course, given by way of specific example, and not as limitations.

In those cases where a still narrower screen slot is required, I lessen the distance between the slot walls in a manner hereinafter described.

After the plate has been slitted by the torch, I place it in a machine and compress it endwise to reduce the slot width. This operation is performed by means of the tool shown in Figs. 3, 4 and 5, wherein a base plate 16 is recessed in its upper side, and has guide bars 17 bolted thereto, with their inner edges overlying the rectangular recess. Cross heads 18 are slidably supported beneath the guide bars 17, and these plates may be inserted beneath the guide bars by removing a key or stop bar 19 that is loosely supported in the plate, and serves as an abutment when the cross heads are placed under compression. At its end, the base 16 has an upstanding projection 20 through which a screw 21 extends. A nut 22 is disposed against the forward end of the projection 20, and a screw 21 has threaded engagement with the said nut. The base 16 is cut out at 23 to permit movement of the screw toward the forward end of the base. The screw 21 has a squared end 24 that may be operated in any suitable manner, as by a ratchet wrench.

With the stop 19 removed, the cross head 18 is first slid into the position shown in Fig. 3, the screen plate 12 is then inserted, after which the cross head 18 is inserted, and the stop bar 19 then brought into position. Slips 25 of metal or paper are inserted into the slots 14, these strips being of a thickness corresponding to the width desired for the slots in the completed plate, and may be placed only near the ends of the slots adjacent to the holes 13 and 15. Thereupon the screw 21 is turned to force the cross head 18 against the end of the plate 12, and such movement is continued until the slot walls are forced against the strips 25. This movement, of course, effects a slight distortion of the metal of the plate, and this distortion is facilitated by reason of the enlarged drilled openings 13 and 15. Ordinarily, in flame-cutting only one row of openings 13 would be required for conveniently starting the flame-cutting operation on each slot, but I provide an additional row of holes at the other edge of the plate to facilitate compression of the plate without excessive distortion of the metal.

After the plate has been properly compressed, it is removed from the press, and the strips 25 taken out. If the strips are metal, they will be knocked out or pulled out, while if they are of paper, they can be burned out by heating the plate. The holes 13 and 15 are then filled, as by an arc-welding operation, and any rough edges or corners in the vicinity of the slots in the holes may be ground off. In some instances a "wire" or rough edge may be formed along the slots during the flame-cutting operation, and these I file off, before putting the plate in the presser.

The screen plate, as shown in the drawings, may be put to any of various uses. For example, it may be adapted to be placed around a pipe that has holes drilled in it to serve, with the plate, as a screen. In this arrangement, the ribs 12a on the bottom of the plate are on the inner side of the plate when it is bent to cylindrical form for the purpose of shrinking or otherwise placing it on the pipe.

While the operation of compressing the screen plate may be employed in connection with plates whose slots are formed by sawing or by burning with torch tips of a different type than that above-described, I find the compressing operation particularly useful in connection with the very narrow slots which I am able to burn in the plate, because so great distortion of the plate is not necessary in order to reduce the width of the slots to the very narrow dimensions which I secure.

Instead of drilling the holes through the thickened or ribbed edge portions of the plate as indicated in Figs. 1 and 2, I may drill them through the thinner or web portion of the plate, as indicated at 27 (Fig. 7).

In compressing the plate of Fig. 7, the pressure is applied only against the web of the plate, and not against the ends of the marginal ribs 29. Spacer strips are, of course, introduced into the slots before compressing of the plate, and I have found that this compressing operation against the web only of the plate, will so displace the relatively thin metal of the web that the walls of the slots in vertical directions, are brought into parallellism with one another, as indicated at 27a in Fig. 8.

It has also been found that by drilling the holes in the thickened marginal portions 29, as shown in Fig. 9, and starting the flame-cutting operation at such holes, and then compressing the plate by pressure applied against the ends of the ribs 29, the slots 28 will be flared as in Fig. 10.

If it is found that the narrowing of the slots by the compressing operation is not uniform, the slots which have been narrowed too greatly may be opened slightly by inserting a fine chisel and imparting a light blow thereto.

Referring now to Figs. 11 and 12, I show a manner in which very narrow screen slots can be formed in a pipe 31. The pipe is first slotted in any suitable manner by a torch as described in connection with Figs. 1 to 10, or other suitable cutting tool. If the slots are formed at points intermediate the ends of the pipe, starting holes corresponding to holes 13 may be drilled at the starting ends of the slots, and holes corresponding to holes 15 may be drilled at the opposite ends of the slots. These holes, may of course, be filled by arc-welding or the like, after the compressing operation hereinafter referred, as are the holes 13 and 15.

The pipe having the previously-formed slots is placed upon rolls 32 and 33 which are journalled in a suitable framework 34. The roll 32 is mounted on a shaft 35 that may be driven from any suitable source of power in order to rotate the pipe. Similarly, the roll 33 may be driven, if desired.

A presser roll 36 is journalled in a rocking frame 37 that may be swung to and from the position shown in Fig. 11. A link or pull rod 38 is connected to the frame and to a piston 39 that is positioned in a cylinder 40. Fluid inlet and exhaust passages 41 and 42 are provided above and below the piston. When fluid pressure is supplied through the passage 41, the roll 36 will, of course, be drawn downwardly, and held against the pipe 31, with the desired degree of pressure. Simultaneously, the roll 32 is driven to rotate the pipe 31. The radial pressures developed by the rolls compress the pipe somewhat, thereby reducing the widths of the slots 44.

It will, of course, be understood that spacing strips of paper or metal are introduced into the slots before the compressing operation, and are thereafter removed as in the case of the screen plate. Ordinarily, paper strips will be employed, since it is more convenient to remove the same by burning than to remove metal strips.

The roll 36 is enlarged at 36a, which enlargement may be in the form of a collar shrunk on the roll. The member 36a constitutes the working surface of the roll, and is preferably of slightly shorter axial dimension than the lengths of the slots. If the slots extend for about ¾ of an inch at each end beyond the adjacent end of the collar 36a, there will be better movement of the metal to reduce the width of the slots, and this will also permit the insertion of a feeler gauge during the rolling of the pipe, to determine the reduction in spacing of the slot walls. As many series of slots 44 as desired may be formed in a pipe, the pipe being shifted longitudinally to bring the various circumferentially-alined series of slots into position beneath the roll 36.

I claim as my invention:—

1. The method of forming screens, which comprises forming laterally-spaced slots in a metal plate, and compressing the plate in a direction transversely of the slots and parallel to the plane of the plate, with sufficient force to displace the unslotted areas at the ends of the slots.

2. The method of forming screens which comprises forming laterally-spaced slots in a metal plate, introducing spacing strips into said slots, and compressing the plate in a direction transversely of the slots and parallel to the plane of the plate, with sufficient force to displace the unslotted areas at the ends of the slots.

3. The method of forming screens, which comprises forming laterally-spaced slots in a metal plate, introducing spacing strips into said slots, compressing the plate in a direction transversely of the slots and parallel to the plane of the plate, with sufficient force to displace the unslotted areas at the ends of the slots, and removing the said strips.

4. The method of forming screens, which comprises forming laterally-spaced slots in a metal plate, the slots being enlarged at their ends and terminating adjacent to the edges of the plate, and compressing the plate in a direction transversely of the slots and parallel to the plane of the plate.

5. The method of forming screens, which comprises forming laterally-spaced slots in a metal plate which is thickened adjacent to its marginal edges, the slots being enlarged at their ends and terminating in such thickened portions, and compressing the plate in a direction transversely of the slots parallel to the plane of the plate.

6. The method of forming screens, which comprises forming laterally-spaced slots in a metal plate, the slots being enlarged at their ends, and compressing the plate in a direction transversely of the slots and parallel to the plane of the plate, the lines of pressure being mainly confined within the area defined by the ends of the slots.

7. The method which comprises forming slots in a portion of a metal body, and thereafter displacing the unslotted metal at the ends of the slots in directions to reduce the width of the slots.

8. The method which comprises forming laterally spaced screen slots in a metal body, and compressing said body to reduce the width of the slots, while maintaining the thickness of the metal in the areas between the slots.

9. The method which comprises forming laterally spaced screen slots in a metal body, compressing said body to reduce the width of the slots, while maintaining substantially the same width of metal in the areas between the slots.

SAMUEL BLAINE STINE.